United States Patent
Mao et al.

(10) Patent No.: US 10,390,225 B2
(45) Date of Patent: Aug. 20, 2019

(54) MOBILE TERMINAL SECURITY AUTHENTICATION METHOD AND SYSTEM AND MOBILE TERMINAL

(71) Applicant: SHENZHEN GOODIX TECHNOLOGY CO., LTD., Shenzhen, Guangdong (CN)

(72) Inventors: Jinyong Mao, Shenzhen (CN); Gengchun Deng, Shenzhen (CN); Bincheng Que, Shenzhen (CN); Cheng Tang, Shenzhen (CN)

(73) Assignee: SHENZHEN GOODIX TECHNOLOGY CO., LTD., Shenzhen, Guangdong (CN)

( * ) Notice: Subject to any disclaimer, the term of this patent is extended or adjusted under 35 U.S.C. 154(b) by 225 days.

(21) Appl. No.: 15/368,822

(22) Filed: Dec. 5, 2016

(65) Prior Publication Data

US 2017/0086072 A1    Mar. 23, 2017

Related U.S. Application Data (63) Continuation of application No. PCT/CN2014/088220, filed on Oct. 9, 2014.

(30) Foreign Application Priority Data

Jun. 12, 2014  (CN) .......................... 2014 1 02622555

(51) Int. Cl.
*H04W 12/06* (2009.01)
*H04L 29/06* (2006.01)
(Continued)

(52) U.S. Cl.
CPC ........... *H04W 12/06* (2013.01); *H04L 63/083* (2013.01); *H04L 63/0853* (2013.01);
(Continued)

(58) Field of Classification Search
None
See application file for complete search history.

(56) References Cited

U.S. PATENT DOCUMENTS 9,223,956 B2 * 12/2015 Hong ..................... G06F 21/32
9,986,086 B2 *  5/2018 Kim ........................ H04W 4/70
(Continued)

FOREIGN PATENT DOCUMENTS

CN      103064624 A     4/2013
CN      103413072 A    11/2013
(Continued)

OTHER PUBLICATIONS

State Intellectual Property Office of the P. R. C., "First Chinese Office Action for Application No. 201410262255.5", China, dated Jul. 19, 2016.
(Continued)

*Primary Examiner* — Christopher A Revak
(74) *Attorney, Agent, or Firm* — Tim Tingkang Xia, Esq.; Locke Lord LLP (57) ABSTRACT

The present disclosure provides a mobile terminal security authentication method and system, and a mobile terminal thereof. The method includes: acquiring, by a mobile terminal, first gesture information, and receiving security authentication information sent by a wearable device; authenticating, by the mobile terminal, identity of the wearable device according to the security authentication information, and authenticating the first gesture information; and determining that the wearable device passes security authentication of the mobile terminal if the wearable device passes identity authentication and the first gesture information passes authentication. With the mobile terminal security authentication method according to the embodiments of the present disclosure, security of user data stored in the mobile (Continued)

terminal is ensured, leakage of user privacy is prevented and user experience is improved.

18 Claims, 5 Drawing Sheets

(51) Int. Cl.
*H04W 12/08* (2009.01)
*H04W 88/06* (2009.01)
*H04W 4/80* (2018.01)
*H04W 12/00* (2009.01)

(52) U.S. Cl.
CPC ........... *H04L 63/107* (2013.01); *H04W 12/08* (2013.01); *H04W 4/80* (2018.02); *H04W 12/00508* (2019.01); *H04W 88/06* (2013.01)

(56) References Cited

U.S. PATENT DOCUMENTS

| | | | |
|---|---|---|---|
| 10,055,563 B2* | 8/2018 | Huang | G06F 3/017 |
| 2011/0018731 A1 | 1/2011 | Linsky et al. | |
| 2011/0156867 A1 | 6/2011 | Carrizo et al. | |
| 2011/0167262 A1* | 7/2011 | Ross | H04W 12/06 713/168 |
| 2015/0178489 A1* | 6/2015 | Nakano | G06F 21/32 726/19 |
| 2016/0028264 A1* | 1/2016 | Bernhard | H02J 7/345 307/21 |
| 2016/0127900 A1* | 5/2016 | John Archibald | H04W 12/06 726/7 |
| 2017/0012972 A1* | 1/2017 | Tanaka | G06F 1/163 |
| 2017/0046508 A1* | 2/2017 | Shin | G06K 9/00892 |
| 2017/0242992 A1* | 8/2017 | Olofsson | G06F 3/017 |
| 2017/0295173 A1* | 10/2017 | Walsh | H04L 63/0861 |
| 2017/0332236 A1* | 11/2017 | Li | H04W 12/08 |
| 2017/0347262 A1* | 11/2017 | Juliato | H04W 12/06 |
| 2018/0103030 A1* | 4/2018 | Einberg | H04L 63/0853 |
| 2018/0181741 A1* | 6/2018 | Whaley | G06F 21/316 |
| 2018/0249000 A1* | 8/2018 | Kim | H04W 4/70 |
| 2019/0053738 A1* | 2/2019 | Zhang | A61B 5/1071 |

FOREIGN PATENT DOCUMENTS

| | | |
|---|---|---|
| CN | 103488284 A | 1/2014 |
| CN | 103576902 A | 2/2014 |
| CN | 103593141 A | 2/2014 |
| CN | 103647587 A | 3/2014 |
| CN | 103654774 A | 3/2014 |
| CN | 103714282 A | 4/2014 |
| CN | 103745142 A | 4/2014 |
| CN | 104050402 A | 9/2014 |

OTHER PUBLICATIONS

State Intellectual Property Office of the P.R. China (ISR/CN), "International Search Report for PCT/CN2014/088220", China, dated Mar. 13, 2015.
State Intellectual Property Office of the P.R. China, "1st Office Action for CN201410262255.5", China, dated Jul. 19, 2016.
State Intellectual Property Office of the P.R. China, "2nd Office Action for CN201410262255.5", China, dated Mar. 16, 2017.
State Intellectual Property Office of the P.R. China, "3rd Office Action for CN201410262255.5", China, dated Jul. 7, 2017.
State Intellectual Property Office of the P.R. China, "Final Office Action for CN201410262255.5", China, dated Jan. 10, 2018.
European Patent Office, "Extended European Search Report for EP Appln No. 14894321.0", Germany, dated Oct. 24, 2017.
Korean Intellectual Property Office, "1st Office Action for KR10-2016-7034706", Korea, dated Jan. 3, 2018.

* cited by examiner

MOBILE TERMINAL SECURITY AUTHENTICATION METHOD AND SYSTEM AND MOBILE TERMINAL

CROSS-REFERENCE TO RELATED APPLICATIONS

This application is a continuation of International Application No. PCT/CN2014/088220 with an international filing date of Oct. 9, 2014, which is based upon and claims priority to Chinese Patent Application No. CN2014102622555, filed on Jun. 12, 2014, the entire contents of all of which are incorporated herein by reference.

TECHNICAL FIELD

The present application relates to the technical field of mobile terminals, and in particular, relates to a mobile terminal security authentication method and system, and a mobile terminal thereof.

BACKGROUND

With the popularity of mobile terminals, users intend to store diversified information in the mobile terminals. At present, when a mobile terminal is in a locked state, the user may unlock the screen of the mobile terminal by tapping combo keys to input a password, or with respect to a touch screen mobile phone, the user performs a touch operation following a predefined trajectory to perform security authentication on the screen, to thus access the mobile terminal.

However, during practice of the present disclosure, the inventors have found that the conventional method for unlocking the screen of the mobile terminal and then accessing the mobile terminal is not only insecure, but also has poor user experience; and moreover, if the password and the gesture for unlocking the screen are known by others, the screen of the mobile terminal may be unlocked by others by using the password and the gesture, and thus applications may be opened by others; consequently, data stored in the mobile terminal is not secure, and privacy leakage may be caused to the user of the mobile terminal.

SUMMARY

The present disclosure may be intended to solve at least one of the above technical problems.

In view of the above, a first objective of the present disclosure is to provide a mobile terminal security authentication method. With the method, no additional operation is needed, and security of user data stored in the mobile terminal is ensured, thereby preventing leakage of user privacy and improving user experience.

A second objective of the present disclosure is to provide a mobile terminal.

A third objective of the present disclosure is to provide a mobile terminal security authentication system.

To achieve the above objects, a first aspect of embodiments of the present disclosure provides a mobile terminal security authentication method. The method includes: acquiring, by a mobile terminal, first gesture information, and receiving security authentication information sent by a wearable device; authenticating, by the mobile terminal, identity of the wearable device according to the security authentication information, and authenticating the first gesture information; and determining that the wearable device passes security authentication of the mobile terminal if the wearable device passes identity authentication and the first gesture information passes authentication.

To achieve the above objectives, a second aspect of embodiments of the present disclosure provides a mobile terminal. The mobile terminal includes: an acquiring module, configured to acquire first gesture information, and receive security authentication information sent by a wearable device; an identity authenticating module, configured to authenticate identity of the wearable device according to the security authentication information; and a gesture information authenticating module, configured to authenticate the first gesture information, and determine that the wearable device passes security authentication of the mobile terminal if the wearable device passes identity authentication and the first gesture information passes authentication.

To achieve the above objectives, a third aspect of embodiments of the present disclosure provides a mobile terminal security authentication system. The system includes a mobile terminal and a wearable device; wherein the wearable device is configured to send security authentication information to the mobile terminal; and the mobile terminal is configured to: acquire first gesture information, receive security authentication information sent by a wearable device, authenticate identity of the wearable device according to the security authentication information, authenticate the first gesture information, and determine that the wearable device passes security authentication of the mobile terminal if the wearable device passes identity authentication and the first gesture information passes authentication.

According to the present disclosure, security authentication information carried on a wearable device is sent by the wearable device to a mobile terminal, the mobile terminal combines identity authentication of the wearable device and authentication of gesture information, and if both identity authentication of the wearable device and authentication of gesture information are successful, the wearable device passes security authentication of the mobile terminal. Hence, no additional operation is needed, and security of user data stored in the mobile terminal is ensured, thereby preventing leakage of user privacy and improving user experience.

The additional aspects and advantages of the present disclosure are partially illustrated in the following description, and the other portions would become more obvious from the following description or would be known from the practice of the present disclosure.

BRIEF DESCRIPTION OF THE DRAWINGS

The above described and/or additional aspects and advantages of the present disclosure would be obvious and simple to understand with reference to the description of the embodiments in combination with the accompanying drawings.

FIG. 4 (a) and FIG. 4 (b) illustrate an application scenario of the mobile terminal security authentication method according to an embodiment of the present disclosure;

DETAILED DESCRIPTION

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary, and are intended to illustrate and interpret the present disclosure, which shall not be construed as causing limitations to the present disclosure. On the contrary, the embodiments of the present disclosure cover all the variations, modifications and equivalents made within the spirit and scope as defined by the appended claims of the present disclosure.

It should be noted that terms such as "first", "second" and the like are merely used for illustration purpose during the description of the present disclosure, and shall not be understood as indicating or implying relative importance. In the description of the present disclosure, it should be noted that unless otherwise specified and defined, the terms "coupled" and "connected" and derivative forms of these words shall be understood in a broad sense, which, for example, may be understood as fixed connection, detachable connection or integral connection; may be mechanically connected or electrically connected; or may be directly connected, indirectly connected via an intermediate medium. Persons of ordinary skill in the art may understand the specific meanings of the above terms in the present disclosure according to the actual circumstances and contexts. In addition, during the description of the present disclosure, the term "multiple", "more" or "a plurality of" refers to at least two unless otherwise specified.

Any process or method description illustrated in the flowcharts or described herein in any manner may be understood as including one or a plurality of modules, segments or portions of codes of executable instructions for implementing specific logic functions or steps in the processes. In addition, the scope of the preferred embodiments of the present disclosure covers other implementations. The implementation of the functions or steps may not be subjected to the illustrated or discussed sequence; however, the functions may be implemented in a substantially simultaneous manner or in a contrary sequence according to the involved functions, which shall be understood by a person skilled in the art according to the embodiments of the present disclosure.

A mobile terminal security authentication method and system and a mobile terminal according to the embodiments of the present disclosure are described hereinafter with reference to the accompanying drawings.

At present, the method of unlocking the screen of a mobile terminal by using a gesture input by the user and then accessing the mobile terminal is not secure. On the basis of the unlocking based on gesture of the mobile terminal, if a wearable device carrying security authentication information is added, the mobile terminal may perform security authentication for the security authentication information carried by the wearable device. In this way, the operations are simple and convenient, and security of user data stored in the mobile terminal is also ensured, thereby preventing leakage of user privacy. Hence, the present disclosure provides a mobile terminal security authentication method.

Figure 1:
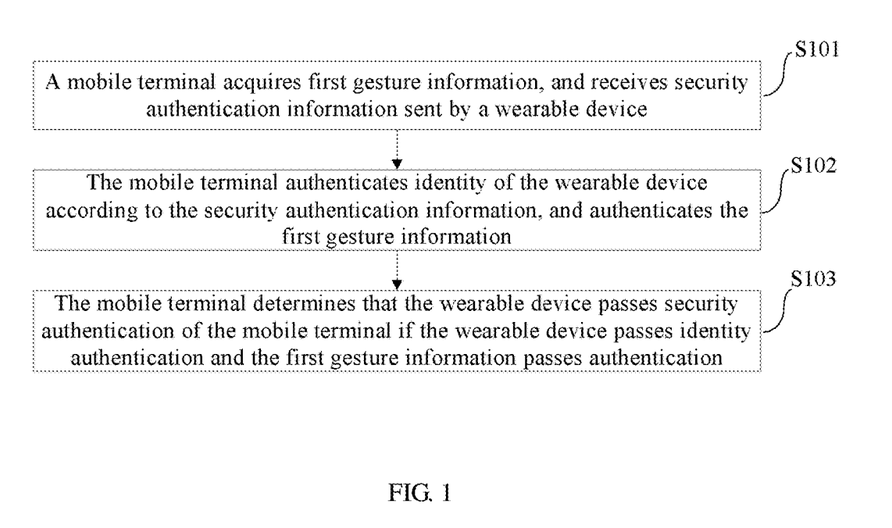
FIG. 1 is a flowchart of a mobile terminal security authentication method according to a first embodiment of the present disclosure.

FIG. 1 is a flowchart of a mobile terminal security authentication method according to a first embodiment of the present disclosure. As illustrated in FIG. 1, the mobile terminal security authentication method includes the following steps:

S101: A mobile terminal acquires first gesture information, and receives security authentication information sent by a wearable device.

In the embodiment of the present disclosure, the wearable device includes, but not limited to, one or more of a bracelet, a watch, gloves, glasses, a ring, clothes, a belt, shoes, stockings and a hat. The wearable device may be worn on the hand or head of a user, and the wearable device may be associated with the mobile terminal. Data communication may be conducted between the wearable device and the mobile terminal in a wireless communication manner, for example, Bluetooth, infrared, WiFi and the like.

Specifically, the mobile terminal may monitor a screen thereof in real time, and when detecting that the user performs a gesture operation on the screen, the mobile terminal may switch a to-be-unlocked state from another working state, and initialize relevant settings. Hence, when detecting that a gesture operation is performed on the screen of the mobile terminal, the mobile terminal may calculate coordinates of the gesture operation, so as to acquire first gesture information input by the user on the screen. In addition, the mobile terminal may send an awaken instruction to the wearable device, such that the wearable device switches from a sleep mode to a working mode according to the awaken instruction. Upon entering the working mode, the wearable device may send the stored security authentication information to the mobile terminal in a wireless communication manner. The security authentication information may be pre-acquired and stored in a memory of the wearable device, and the security authentication information is used for the mobile terminal to authenticate identity of the wearable device.

S102: The mobile terminal authenticates identity of the wearable device according to the security authentication information, and authenticates the first gesture information.

In the embodiment of the present disclosure, the mobile terminal calculates a distance between the mobile terminal and the wearable device according to the security authentication information, judges whether the distance between the mobile terminal and the wearable device is less than a predetermined threshold, and determines that the wearable device passes identity authentication if the distance between the mobile terminal and the wearable device is less than the predetermined threshold. Specifically, the security authentication information may include information of the distance between the wearable device and the mobile terminal. That is, the wearable device may determine the distance between the wearable device and the mobile terminal by detecting the received signal strength indication (RSSI) value of a wireless signal transmitted by the mobile terminal, or by means of a distance sensor and the like on the wearable device, and send the distance as the security authentication information to the mobile terminal. If the mobile terminal judges that the distance between the mobile terminal and the wearable device is less than a predetermined threshold, the wearable device falls within an operable range of the mobile terminal. That is, the user of the wearable device is in the vicinity of the mobile terminal. Hence, it may be determined that an authorized user desires to operate the mobile terminal, that is, the wearable device passes identity authentication.

In the embodiment of the present disclosure, the mobile terminal acquires password information from the security authentication information, extracts pre-stored password information from the local end, and compares the acquired password information with the extracted password information. If the password information is consistent, the mobile terminal determines that the wearable device passes identity authentication. To be specific, the security authentication information may include password information, that is, the appointed password information may be pre-stored in both the wearable device and the mobile terminal. By comparison of the password information, it is determined that an authorized user performs an operation for the mobile terminal. Before sending security authentication information to the mobile terminal, the wearable device may encrypt the security authentication information. For example, the wearable device encrypts the password information by using a stored public key, and then sends the encrypted password information to the mobile terminal. Upon receiving the encrypted password information, the mobile terminal may decrypt the password information by using a stored private key, and then judge whether the decrypted password information matches with the password information pre-stored in the mobile terminal, thus to determine whether identity authentication of the wearable device is successful.

In the embodiment of the present disclosure, based on the above two manners of performing identity authentication for the wearable device according to the security authentication information, a manner of performing authentication in combination with biometric information of the user may also be considered. In other words, the mobile terminal may firstly authenticate identity of the wearable device, and then authenticate the identity of the user wearing the wearable device. That is, the mobile terminal firstly determines whether the wearable device is an authorized device, and then determines whether the user is an authorized user, to thus further improve accuracy of identity authentication. Specifically, the mobile terminal acquires biometric information from the security authentication information, extracts pre-stored biometric information from the local end, and compares the acquired biometric information with the extracted biometric information. If the biometric information is consistent, the mobile terminal determines that the wearable device passes identity authentication. The biometric information locally pre-stored in the mobile terminal may be acquired by the wearable device, and sent by the wearable device to the mobile terminal, such that the mobile terminal stores the biometric information of the user at the local end. The biometric information may include, but not limited to, one or more of vein feature information, odor feature information, skin feature information, vascular texture feature information, palm feature information, eye feature information and face feature information.

Further, the mobile terminal judges whether the first gesture information matches with gesture information pre-stored in the mobile terminal.

It should be noted that the sequence of identity authentication of the wearable device and authentication of the first gesture information may be randomly adjusted, which is not limited herein.

S103: It is determined that the wearable device passes security authentication of the mobile terminal if the wearable device passes identity authentication and the first gesture information passes authentication.

When both identity authentication of the wearable device and authentication of the first gesture information are successful, it is considered that the wearable device passes security authentication of the mobile terminal.

In the embodiment of the present disclosure, after the wearable device passes security authentication of the mobile terminal, the mobile terminal sends a sleep instruction to the wearable device, such that the wearable device switches from the working mode to the sleep mode according to the sleep instruction. Hence, power energy of the wearable device may be saved.

With the mobile terminal security authentication method according to the embodiment of the present disclosure, security authentication information carried on a wearable device is sent by the wearable device to a mobile terminal, the mobile terminal combines identity authentication of the wearable device and authentication of gesture information, and if both identity authentication of the wearable device and authentication of gesture information are successful, the wearable device passes security authentication of the mobile terminal. Hence, no additional operation is needed, and security of user data stored in the mobile terminal is ensured, thereby preventing leakage of user privacy and improving user experience.

Figure 2:
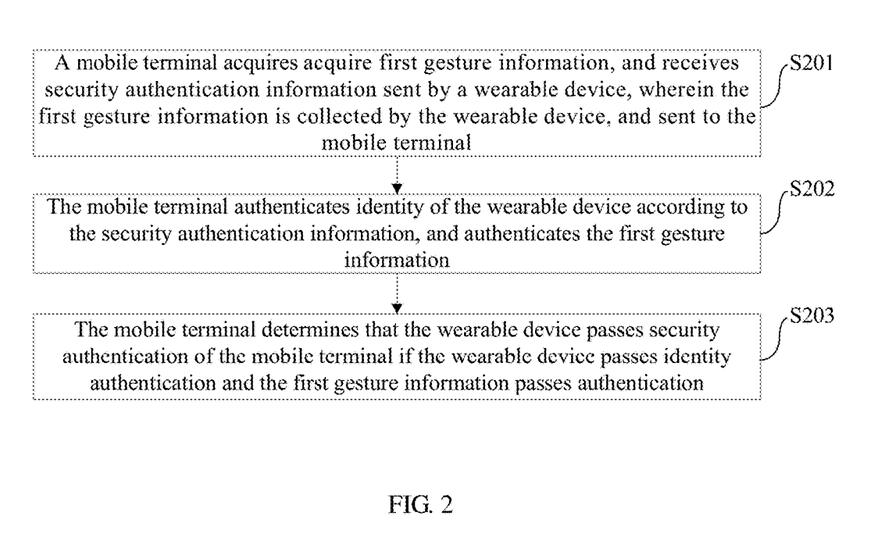
FIG. 2 is a flowchart of a mobile terminal security authentication method according to a second embodiment of the present disclosure.

FIG. 2 is a flowchart of a mobile terminal security authentication method according to a second embodiment of the present disclosure. As illustrated in FIG. 2, the mobile terminal security authentication method includes the following steps:

Step S201: A mobile terminal acquires acquire first gesture information, and receives security authentication information sent by a wearable device, wherein the first gesture information is collected by the wearable device, and sent to the mobile terminal.

In the embodiment of the present disclosure, the mobile terminal may in real time monitor the screen of the mobile terminal, and when monitoring that a user performs a gesture operation on the screen, the mobile terminal may switches from another working state to a to-be-unlocked state, and initialize the relevant settings. In addition, the mobile terminal may send an awaken instruction to the wearable device, such that the wearable device switches from the sleep mode to the working mode according to the awaken instruction. After the wearable device enters the working mode, the sensor in the wearable device collects the gesture operation of the user, for example, collects the data of the gesture operations of the user by using a gyroscope sensor, an acceleration sensor, a direction sensor and the like, and calculates the first gesture information according to the collected data. Afterwards, the wearable device sends the first gesture information and the stored security authentication information to the mobile terminal in a wireless communication manner.

S202: The mobile terminal authenticates identity of the wearable device according to the security authentication information, and authenticates the first gesture information.

The mobile terminal authenticates identity of the wearable device, and the mobile terminal judges whether the first gesture information matches with gesture information pre-stored in the mobile terminal.

S203: It is determined that the wearable device passes security authentication of the mobile terminal if the wearable device passes identity authentication and the first gesture information passes authentication.

With the mobile terminal security authentication method according to the embodiment of the present disclosure, gesture information collected by a wearable device and security authentication information carried on the wearable device is sent by the wearable device to a mobile terminal, the mobile terminal combines identity authentication of the wearable device and authentication of gesture information, and if both identity authentication of the wearable device and authentication of gesture information are successful, the wearable device passes security authentication of the mobile terminal. Hence, no additional operation is needed, and security of user data stored in the mobile terminal is ensured, thereby preventing leakage of user privacy and improving user experience.

Figure 3:
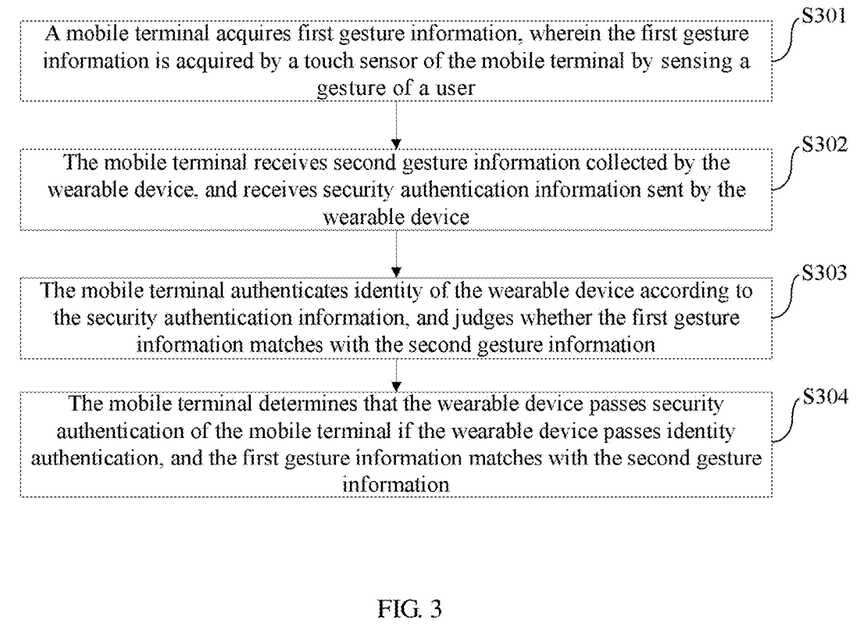
FIG. 3 is a flowchart of a mobile terminal security authentication method according to a third embodiment of the present disclosure.

FIG. 3 is a flowchart of a mobile terminal security authentication method according to a third embodiment of the present disclosure. As illustrated in FIG. 3, the mobile terminal security authentication method includes the following steps:

S301: A mobile terminal acquires first gesture information, wherein the first gesture information is acquired by a touch sensor of the mobile terminal by sensing a gesture of a user.

Specifically, the mobile terminal may in real time monitor the screen thereof, and when detecting that the user performs a gesture operation on the screen, the mobile terminal may switch from another working state to a to-be-unlocked state, and initialize relevant settings. Hence, when detecting that a gesture operation is performed on the screen of the mobile terminal, the mobile terminal may calculate coordinates of the gesture operation, so as to acquire first gesture information input by the user on the screen. In addition, the mobile terminal may send an awaken instruction to the wearable device, such that the wearable device switches from the sleep mode to the working mode according to the awaken instruction.

S302: The mobile terminal receives second gesture information collected by the wearable device, and receives security authentication information sent by the wearable device.

In the embodiment of the present disclosure, after the wearable device enters the working mode, the sensor in the wearable device collects the gesture operation of the user, for example, collect the data of the gesture operations of the user by using a gyroscope sensor, an acceleration sensor, a direction sensor and the like, and calculates the second gesture information according to the collected data. Afterwards, the wearable device sends the second gesture information and the stored security authentication information to the mobile terminal in a wireless communication manner.

S303: The mobile terminal authenticates identity of the wearable device according to the security authentication information, and judges whether the first gesture information matches with the second gesture information.

The mobile terminal authenticates identity of the wearable device, and the mobile terminal judges whether the first gesture information matches with the second gesture information received from the wearable device.

S304: It is determined that the wearable device passes security authentication of the mobile terminal if the wearable device passes identity authentication, and the first gesture information matches with the second gesture information.

With the mobile terminal security authentication method according to the embodiment of the present disclosure, gesture information collected by a wearable device and security authentication information carried on the wearable device is sent by the wearable device to a mobile terminal, the mobile terminal combines identity authentication of the wearable device and authentication of gesture information, and if identity authentication of the wearable device is successful and it is determined that the gesture information collected by the wearable device is consistent with the gesture information identified by the mobile terminal, the wearable device passes security authentication of the mobile terminal. Hence, no additional operation is needed, and security of user data stored in the mobile terminal is ensured, thereby preventing leakage of user privacy and improving user experience.

Figure 4:
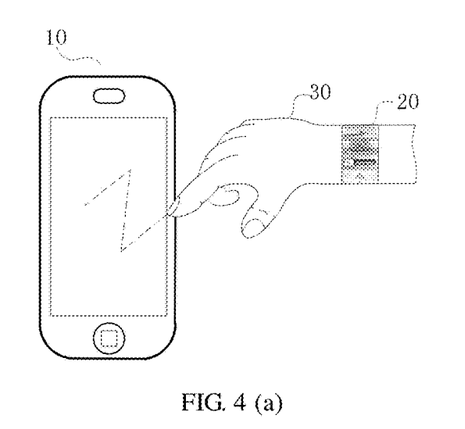

A mobile terminal security authentication method according to a third embodiment of the present disclosure is described hereinafter with reference to a practical scenario. FIG. 4 (a) and FIG. 4 (b) illustrate an application scenario of the mobile terminal security authentication method according to an embodiment of the present disclosure.

As illustrated in FIG. 4 (a) and FIG. 4 (b), a mobile terminal 10 includes: a touch screen 11, a processor 12, a touch management module 13, a wireless module 14 and a memory 15. The touch screen 11 is an input device of the mobile terminal 10, for example, a capacitive touch screen. The processor 12 has a control chip, and is a core part of the mobile terminal 10 and configured to coordinate processing of relevant services. The touch management module 13 has a touch chip, and is a management module of the touch screen 11 and is configured to carry out sensing-based parsing of touches by the fingers of a user. The wireless module is 14 a module for communication between the mobile terminal 10 and the wearable device 20. The memory 15 is configured to store data, programs and relevant operation processing and the like of the processor 12.

The wearable device 20 includes: a sensor 21, a wireless module 22, a processor 23, a security module 24 and a memory 25. The sensor 21 may be, for example, a gyroscope sensor, an acceleration sensor and the like, which is configured to identify sensing of a gesture of the user. The wireless module 22 is configured to exchange information with the mobile terminal 10. The processor 23 is configured to operate the gesture collected by the sensor 21, and control the system of the entire wearable device. The security module 24 is configured to store the core security authentication information, and carry out encryption and decryption operations for the security authentication information by operation via hardware. The memory 25 is configured to store data, programs and instructions and data that are currently run by the processor 23, and exchange information with the processor 23.

The wearable device 20, for example, a watch which is worn on the wrist of the user 30 and works in a low-power consumption sleep mode. After the user 30 swipes a gesture on the touch screen 11 of the mobile terminal 10, the touch management module 13 of the mobile terminal 10 constantly detects the gesture, and calculates touch coordinates and acquires the gesture information within this period of time. In addition, the mobile terminal 10 awakens the wearable device 20 by using the wireless module 14, and the wearable device 20 switches from the low-power consumption sleep mode to a working mode. The wearable device 20 starts the sensor 21, collects gestures of the user via the sensor 21, and calculates, via the processor 23, gesture information corresponding to the gestures collected by the sensor 21. The wearable device 20 subjects the gesture information and the security authentication information stored in the security module 24 to an encryption operation, and transmits the encrypted gesture information and security authentication information to the mobile terminal 10 via the wireless communication module 22, wherein the gesture information and the security authentication information may be separately transmitted. After the processor 12 of the mobile terminal 10 authenticates identity information, the processor 12 compares whether the gesture information collected by the sensor 21 of the wearable device 20 is consistent with the gesture information calculated by the touch management module 13. If the gesture information is consistent, security authentication is successful.

Figure 5:
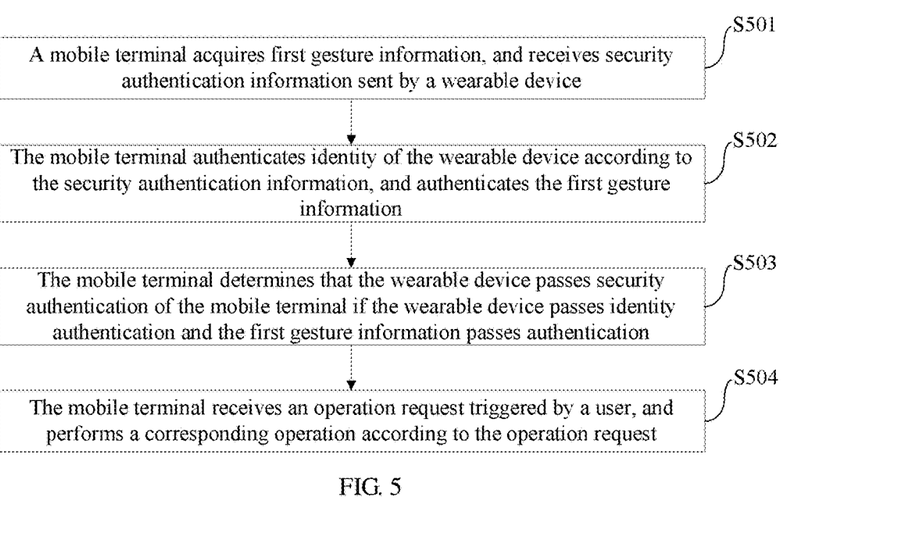
FIG. 5 is a flowchart of a mobile terminal security authentication method according to a fourth embodiment of the present disclosure.

FIG. 5 is a flowchart of a mobile terminal security authentication method according to a fourth embodiment of the present disclosure. As illustrated in FIG. 5, the mobile terminal security authentication method includes the following steps:

S501: A mobile terminal acquires first gesture information, and receives security authentication information sent by a wearable device.

S502: The mobile terminal authenticates identity of the wearable device according to the security authentication information, and authenticates the first gesture information.

S503: It is determined that the wearable device passes security authentication of the mobile terminal if the wearable device passes identity authentication and the first gesture information passes authentication.

S504: The mobile terminal receives an operation request triggered by a user, and performs a corresponding operation according to the operation request.

In the embodiment of the present disclosure, the mobile terminal receives operation requests in different levels triggered by the user, acquires level information from the security authentication information, performs an operation corresponding to the level, and enters a related application. Specifically, the mobile terminal may set different levels for different users. For example, the mobile terminal may generate corresponding level information according to the address book of the users, and assign a higher level to a user who is frequently contacted, assign a lower level to a user who is less contacted, and assign no level to a user who is never contacted. In addition, the mobile terminal may define the owner of the mobile terminal as a personnel within the system, and assign an authority which allows the owner to enter the mobile terminal and modify the system information and the like. The mobile terminal sends the level information corresponding to the user to the wearable device, such that the wearable device stores the level information. When a user wears the wearable device and performs an operation, the level at which the user may enter the system may be determined according to the level information of the user, such that the user is authorized to perform a corresponding operation and enter a related application.

With the mobile terminal security authentication method according to the embodiment of the present disclosure, after security authentication of the mobile terminal is successful, operation requests in different levels triggered by the user is received, and a corresponding application may be executed when the user has a corresponding level. This further improves security of user data stored in the mobile terminal, and prevents leakage of user privacy.

To practice the above embodiments, the present disclosure further provides a mobile terminal.

Figure 6:
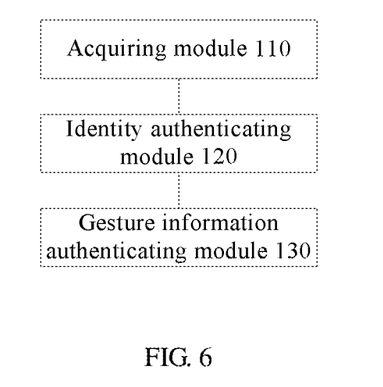
FIG. 6 is a schematic structural diagram of a mobile terminal according to a fifth embodiment of the present disclosure.

FIG. 6 is a schematic structural diagram of a mobile terminal according to a fifth embodiment of the present disclosure. As illustrated in FIG. 6, the mobile terminal includes: an acquiring module 110, an identity authenticating module 120 and a gesture information authenticating module 130.

Specifically, the acquiring module 110 is configured to acquire first gesture information, and receive security authentication information sent by a wearable device. Specifically, the mobile terminal may in real time monitor the screen thereof, and when detecting that the user performs a gesture operation on the screen, the mobile terminal may switch from another working state to a to-be-unlocked state, and initialize relevant settings. Hence, when detecting that a gesture operation is performed on the screen of the mobile terminal, the acquiring module 110 may calculate coordinates of the gesture operation, so as to acquire first gesture information input by the user on the screen.

The identity authenticating module 120 is configured to authenticate identity of the wearable device according to the security authentication information.

The gesture information authenticating module 130 is configured to authenticate first gesture information, and determine that the wearable device passes security authentication of the mobile terminal if the first gesture information passes authentication.

With the mobile terminal according to the embodiment of the present disclosure, security authentication information carried on a wearable device is sent by the wearable device to a mobile terminal, the mobile terminal combines identity authentication of the wearable device and authentication of gesture information, and if both identity authentication of the wearable device and authentication of gesture information are successful, the wearable device passes security authentication of the mobile terminal. Hence, no additional operation is needed, and security of screen unlocking of the mobile terminal may be improved, thereby ensuring security of user data stored in the mobile terminal, preventing leakage of user privacy and improving user experience.

Figure 7:
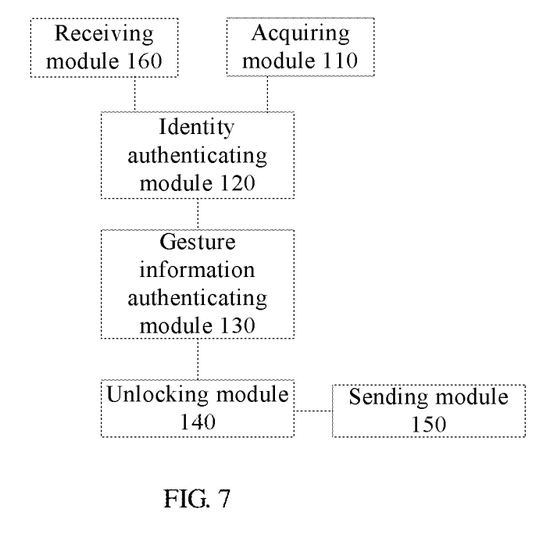
FIG. 7 is a schematic structural diagram of a mobile terminal according to a sixth embodiment of the present disclosure.

FIG. 7 is a schematic structural diagram of a mobile terminal according to a sixth embodiment of the present disclosure. As illustrated in FIG. 7, the mobile terminal includes: an acquiring module 110, an identity authenticating module 120, a gesture information authenticating module 130, an unlocking module 140, a sending module 150 and a receiving module 160.

The acquiring module 110, the identity authenticating module 120 and the gesture information authenticating module 130 herein are the same as those in the above embodiment.

Further, the mobile terminal further includes an unlocking module 140, a sending module 150 and a receiving module 160. The unlocking module 140 is configured to unlock the screen if the first gesture information passes authentication. After the unlocking module unlocks the screen, the sending module 150 sends a sleep instruction to the wearable device, such that the wearable device switches from the working mode to the sleep mode according to the sleep instruction. As such, power energy of the wearable device may be saved. The receiving module 160 is configured to receive second gesture information collected by the wearable device, wherein the second gesture information is acquired by the wearable device by identifying a gesture of the user. Specifically, after the wearable device enters the working mode, the sensor in the wearable device collects the gesture operation of the user, for example, collects the data of the gesture operations of the user by using a gyroscope sensor, an acceleration sensor, a direction sensor and the like, and calculates second gesture information according to the collected data. Afterwards, the wearable device sends the second gesture information and the stored security authentication information to the receiving module 160 in a wireless communication manner.

The gesture information authenticating module 130 is further configured to judge whether the first gesture information matches with the second gesture information. Specifically, the mobile terminal may in real time monitor the screen thereof, and when detecting that the user performs a gesture operation on the screen, the mobile terminal may switch from another working state to a to-be-unlocked state, and initialize relevant settings. Hence, when detecting that a gesture operation is performed on the screen of the mobile terminal, the acquiring module 110 may calculate coordinates of the gesture operation, so as to acquire first gesture information input by the user on the screen. Furthermore, if the identity authenticating module 120 successfully authenticates identity of the wearable device, the gesture information authenticating module 130 continuously judge whether the first gesture information matches with the second gesture information received from the wearable device.

With the mobile terminal according to the embodiment of the present disclosure, gesture information collected by a wearable device and security authentication information carried on the wearable device is sent by the wearable device to a mobile terminal, the mobile terminal combines identity authentication of the wearable device and authentication of gesture information, and if identity authentication of the wearable device is successful and it is determined that the gesture information collected by the wearable device is consistent with the gesture information identified by the mobile terminal, the wearable device passes security authentication of the mobile terminal. Hence, no additional operation is needed, and security of user data stored in the mobile terminal is ensured, thereby preventing leakage of user privacy and improving user experience.

Figure 8:
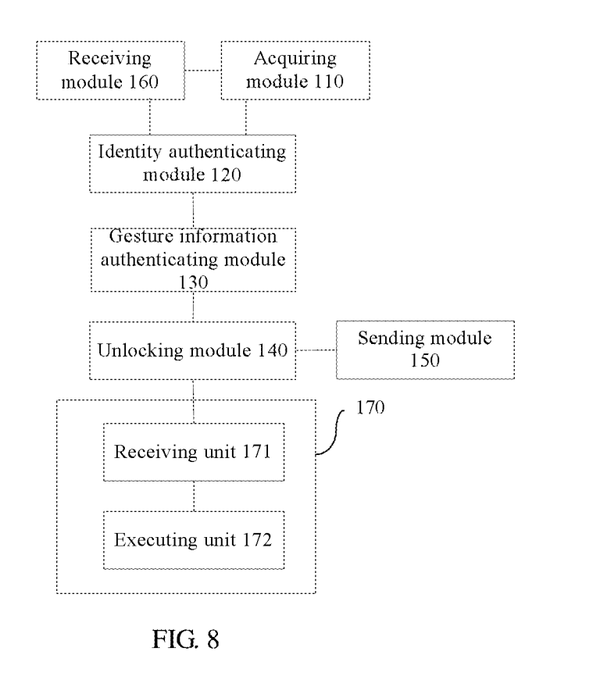
FIG. 8 is a schematic structural diagram of a mobile terminal according to a seventh embodiment of the present disclosure.

FIG. 8 is a schematic structural diagram of a mobile terminal according to a seventh embodiment of the present disclosure. As illustrated in FIG. 8, the mobile terminal includes: an acquiring module 110, an identity authenticating module 120, a gesture information authenticating module 130, an unlocking module 140, a sending module 150, a receiving module 160 and an operating module 170; wherein the operating module 170 specifically includes a receiving unit 171 and an executing unit 172.

The acquiring module 110, the identity authenticating module 120, the gesture information authenticating module 130, the unlocking module 140, the sending module 150 and the receiving module 160 herein are the same as those in the above embodiment.

Specifically, the operating module 170 is configured to receive an operation request triggered by a user, and perform a corresponding operation according to the operation request.

In the embodiment of the present disclosure, the operating module 170 specifically includes a receiving unit 171 and an executing unit 172. The receiving unit 171 is configured to receive operation requests in different levels triggered by the user, and acquire level information from the security authentication information. The executing unit 172 is configured to, when the user has a level corresponding to the level information, perform an operation corresponding to the level and enter a related application. To be specific, the operating module 170 may set different levels for different users. For example, the operating module 170 may generate corresponding level information according to the address book of the users, and assign a higher level to a user who is frequently contacted, assign a lower level to a user who is less contacted, and assign no level to a user who is never contacted. In addition, the operating module 170 may define the owner of the mobile terminal as a personnel in the system, and assign an authority which allows the owner to enter the mobile terminal and modify the system information and the like. The operating module 170 sends the level information corresponding to the user to the wearable device, such that the wearable device stores the level information. When a user wears the wearable device and performs an operation, the receiving unit 171 receives operation requests in different levels triggered by the user, and then the executing unit 172 determines the level in which the user may enter the system according to the level information of the user, such that the user is authorized to perform a corresponding operation and enter a related application.

With the mobile terminal according to the embodiment of the present disclosure, after the screen of the mobile terminal is unlocked, operation requests in different levels triggered by the user is received, and a corresponding application may be executed when the user has a corresponding level. This further improves security of user data stored in the mobile terminal, and prevents leakage of user privacy.

To practice the above embodiments, the present disclosure further provides a mobile terminal security authentication system.

Figure 9:
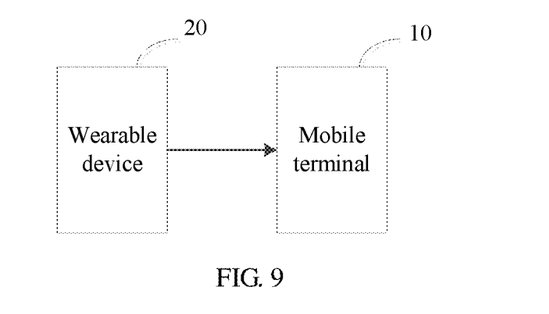
FIG. 9 is a flowchart of a mobile terminal security authentication system according to an eighth embodiment of the present disclosure.

FIG. 9 is a flowchart of a mobile terminal security authentication system according to an eighth embodiment of the present disclosure. As illustrated in FIG. 9, the mobile terminal security authentication system includes: a mobile terminal 10 and a wearable device 20.

The mobile terminal 10 is configured to: acquire first gesture information, receive security authentication information sent by the wearable device 20, authenticate identity of the wearable device 20 according to the security authentication information, authenticate the first gesture information, and determine that the wearable device passes security authentication of the mobile terminal if the wearable device passes identity authentication and the first gesture information passes authentication.

In the embodiment of the present disclosure, the wearable device 20 includes, but not limited to, one or more of a bracelet, a watch, gloves, glasses, a ring, clothes, a belt, shoes, stockings and a hat. The wearable device 20 may be worn on the hand or head of a user, and the wearable device 20 may be associated with the mobile terminal 10. Data communication may be conducted between the wearable device 20 and the mobile terminal 10 in a wireless communication manner, for example, Bluetooth, infrared, WiFi and the like. Specifically, the mobile terminal 10 may in real time monitor the screen thereof, and when detecting that the user performs a gesture operation on the screen, the mobile terminal 10 may switch from another working state to a to-be-unlocked state, and initialize relevant settings. Hence, when detecting that a gesture operation is performed on the screen of the mobile terminal, the mobile terminal 10 may calculate coordinates of the gesture operation, so as to acquire first gesture information input by the user on the screen. In addition, the mobile terminal 10 may send an awaken instruction to the wearable device 20, such that the wearable device 20 switches from the sleep mode to the working mode according to the awaken instruction. Upon entering the working mode, the wearable device 20 may send the stored security authentication information to the mobile terminal 10 in a wireless communication manner. The security authentication information may be pre-acquired by the wearable device 20 and stored in a memory of the wearable device 20, and the security authentication information is used for the mobile terminal 10 to authenticate identity of the wearable device 20.

In an embodiment of the present disclosure, the mobile terminal 10 may also be configured to acquire a distance between the mobile terminal 10 and the wearable device 20 from the security authentication information, judge whether the distance between the mobile terminal 10 and the wearable device 20 is less than a predetermined threshold, and determine that the wearable device 20 passes identity authentication if the distance between the mobile terminal 10 and the wearable device 20 is less than the predetermined threshold. Specifically, the security authentication information may include information of the distance between the wearable device 20 and the mobile terminal 10. That is, the wearable device 20 may determine the distance between the wearable device 20 and the mobile terminal 10 by detecting the received signal strength indication (RSSI) value of a wireless signal transmitted by the mobile terminal 10, or by means of a distance sensor and the like on the wearable device 20, and send the distance as the security authentication information to the mobile terminal 10. If the mobile terminal 10 judges that the distance between the mobile terminal 10 and the wearable device 20 is less than the predetermined threshold, the wearable device 20 falls within an operable range of the mobile terminal 10. That is, the user of the wearable device 20 is in the vicinity of the mobile terminal 10. Hence, it may be determined that an authorized user desires to operate the mobile terminal 10, that is, the wearable device 20 passes identity authentication.

In an embodiment of the present disclosure, the mobile terminal 10 is further configured to acquire password information from the security authentication information, extract pre-stored password information from the local end, and compare the acquired password information with the extracted password information. If the password information is consistent, the mobile terminal determines that the wearable device 20 passes identity authentication. To be specific, the security authentication information may include password information, that is, the appointed password information may be pre-stored in both the wearable device 20 and the mobile terminal 10. By comparison of the password information, it is determined that an authorized user performs an operation for the mobile terminal 10. Before sending security authentication information to the mobile terminal 10, the wearable device 20 may encrypt the security authentication information. For example, the wearable device 20 encrypts the password information by using a stored public key, and then sends the encrypted password information to the mobile terminal 10. Upon receiving the encrypted password information, the mobile terminal 10 may decrypt the password information by using a stored private key, and then judge whether the decrypted password information matches with the password information pre-stored in the mobile terminal 10, thus to determine whether identity authentication of the wearable device 20 is successful.

In an embodiment of the present disclosure, based on the above two manners of performing identity authentication for the wearable device 20 according to the security authentication information, the mobile terminal 10 may also consider a manner of performing authentication in combination with biometric information of the user. In other words, the mobile terminal 10 may firstly authenticate identity of the wearable device 20, and then authenticate the identity of the user wearing the wearable device 20. That is, the mobile terminal 10 firstly determines whether the wearable device 20 is an authorized device, and then determines whether the user is an authorized user, to thus further improve accuracy of identity authentication. Specifically, the mobile terminal 10 acquires biometric information from the security authentication information, extracts pre-stored biometric information from the local end, and compares the acquired biometric information with the extracted biometric information. If the biometric information is consistent, it is determined that that the wearable device 20 passes identity authentication. The biometric information locally pre-stored in the mobile terminal 10 may be acquired by the wearable device 20, and sent by the wearable device 20 to the mobile terminal 10, such that the mobile terminal 10 stores the biometric information of the user at the local end. The biometric information may include, but not limited to, one or more of vein feature information, odor feature information, skin feature information, vascular texture feature information, palm feature information, eye feature information and face feature information.

The mobile terminal 10 authenticates identity of the wearable device 20, and the mobile terminal 10 judges whether the first gesture information matches with gesture information pre-stored in the mobile terminal. If the wearable device 20 passes identity authentication, and the mobile terminal 10 judges that the first gesture information matches with the predetermined gesture information, the screen is unlocked.

In an embodiment of the present disclosure, after the screen of the mobile terminal 10 is unlocked, the mobile terminal 10 sends a sleep instruction to the wearable device 20, such that the wearable device 20 switches from the working mode to the sleep mode according to the sleep instruction. Hence, power energy of the wearable device may be saved.

With the mobile terminal security authentication system according to the embodiment of the present disclosure, security authentication information carried on a wearable device is sent by the wearable device to a mobile terminal, the mobile terminal combines identity authentication of the wearable device and authentication of gesture information, and if both identity authentication of the wearable device and authentication of gesture information are successful, the screen of the mobile terminal is unlocked. Hence, no additional operation is needed and security of screen unlocking of the mobile terminal is improved, thereby ensuring security of user data stored in the mobile terminal, thereby preventing leakage of user privacy and improving user experience.

In an embodiment of the present disclosure, the first gesture information is acquired by the wearable device 20, and sent to the mobile terminal 10. To be specific, the mobile terminal 10 may in real time monitor the screen of the mobile terminal 10, and when monitoring that a user performs a gesture operation on the screen, the mobile terminal 10 may switches from another working state to a to-be-unlocked state, and initialize the relevant settings. In addition, the mobile terminal 10 may send an awaken instruction to the wearable device 20, such that the wearable device 20 switches from the sleep mode to the working mode according to the awaken instruction. After the wearable device 20 enters the working mode, the sensor in the wearable device 20 collects the gesture operation of the user, for example, collects the data of the gesture operations of the user by using a gyroscope sensor, an acceleration sensor, a direction sensor and the like, and calculates first gesture information according to the collected data. Afterwards, the wearable device 20 sends the first gesture information and the stored security authentication information to the mobile terminal 10 in a wireless communication manner.

In an embodiment of the present disclosure, the first gesture information is acquired by the mobile terminal 10 by identifying a gesture of the user, and the mobile terminal 10 is further configured to receive second gesture information collected by the wearable device 20, and perform matching and authentication for the first gesture information according to the second gesture information, wherein the second gesture information is automatically acquired by the wearable device 20 by identifying the gesture of the user. Specifically, the mobile terminal 10 may in real time monitor the screen thereof, and when detecting that the user performs a gesture operation on the screen, the mobile terminal 10 may switch from another working state to a to-be-unlocked state, and initialize relevant settings. Hence, when detecting that a gesture operation is performed on the screen of the mobile terminal 10, the mobile terminal 10 may calculate coordinates of the gesture operation, so as to acquire first gesture information input by the user on the screen. In addition, the mobile terminal 10 may send an awaken instruction to the wearable device 20, such that the wearable device 20 switches from the sleep mode to the working mode according to the awaken instruction. After the wearable device 20 enters the working mode, the sensor in the wearable device 20 collects the gesture operation of the user, for example, collects the data of the gesture operations of the user by using a gyroscope sensor, an acceleration sensor, a direction sensor and the like, and calculates second gesture information according to the collected data. Afterwards, the wearable device 20 sends the second gesture information and the stored security authentication information to the mobile terminal 10 in a wireless communication manner. If the mobile terminal 10 successfully authenticates identity of the wearable device 20, the mobile terminal 10 judges whether the first gesture information matches with the second gesture information received from the wearable device 20.

In an embodiment of the present disclosure, the mobile terminal 10 receives an operation request triggered by a user performs a corresponding operation according to the operation request. The mobile terminal 10 receives operation requests in different levels triggered by the user, acquires level information from the security authentication information, performs an operation corresponding to the level, and enters a related application. Specifically, the mobile terminal 10 may set different levels for different users. For example, the mobile terminal 10 may generate corresponding level information according to the address book of the users, and assign a higher level to a user who is frequently contacted, assign a lower level to a user who is less contacted, and assign no level to a user who is never contacted. In addition, the mobile terminal 10 may define the owner of the mobile terminal 10 as a personnel in the system, and assign an authority which allows the owner to enter the mobile terminal and modify the system information and the like. The mobile terminal 10 sends the level information corresponding to the user to the wearable device 20, such that the wearable device 20 stores the level information. When a user wears the wearable device and performs an operation, the level in which the user may enter the system may be determined according to the level information of the user, such that the user is authorized to perform a corresponding operation and enter a related application. Hence, after the screen of the mobile terminal 10 is unlocked, operation requests in different levels triggered by the user is received, and a corresponding application may be executed when the user has a corresponding level. This further improves security of user data stored in the mobile terminal 10, and prevents leakage of user privacy.

It should be understood that each part of the present disclosure may be implemented by using hardware, software, firmware or a combination of them. In the above embodiments, the multiple steps or methods may be implemented by using software or firmware which is stored in a memory and executed by a suitable instruction execution system. For example, if the multiple steps or methods are implemented by using hardware, similar to another embodiment, the steps or methods may be implemented by using any one or a combination of the following technologies that are commonly known in the art: a discrete logic circuit of a logic gate circuit configured to implement logic function to data signals, an application specific integrated circuit having a suitable combinational logic gate, a programmable gate array (PGA), a field-programmable gate array (FPGA), and the like.

In the description of the present specification, reference terms such as "an embodiment", "some embodiments", "examples", "specific examples", "some examples", or the like are intended to refer to that the specific features, structures, materials, or characteristics which are described in combination with the embodiments or examples are comprised in at least one embodiment or example of the present disclosure. In this specification, schematic expressions of the above terms do not necessarily indicate the same embodiments or examples. In addition, the described specific features, structures, materials, or characteristics may be combined in any one or multiple embodiments or examples in a suitable way.

Although the embodiments of the present disclosure are described in detail above, persons or ordinary skill in the art may understand that without departing from the principle and intention of the present disclosure, various variations, modifications and replacements may be made to these embodiments, and the scope of the present disclosure is defined by the appended claims and their equivalents.

INDUSTRIAL PRACTICABILITY

According to the present disclosure, security authentication information carried on a wearable device is sent by the wearable device to a mobile terminal, the mobile terminal combines identity authentication of the wearable device and authentication of gesture information, and if both identity authentication of the wearable device and authentication of gesture information are successful, the wearable device passes security authentication of the mobile terminal. Hence, no additional operation is needed, and security of user data stored in the mobile terminal is ensured, thereby preventing leakage of user privacy and improving user experience.

What is claimed is:
1. A mobile terminal security authentication method, comprising:
 acquiring, by a mobile terminal, first gesture information, and receiving security authentication information sent by a wearable device, wherein the security authentication information is pre-acquired and stored in a memory of the wearable device, and the security authentication information is used by the mobile terminal to perform identity authentication of the wearable device;

authenticating, by the mobile terminal, identity of the wearable device according to the security authentication information, and authenticating the first gesture information; and determining, by the mobile terminal, that the wearable device passes security authentication of the mobile terminal if the wearable device passes the identity authentication and the first gesture information passes authentication;

wherein the method further comprises:

receiving, by the mobile terminal, second gesture information which is collected by the wearable device;

wherein the authenticating the first gesture information comprises:

judging, by the mobile terminal, whether the first gesture information matches with the second gesture information; and determining, by the mobile terminal, the first gesture information passes the authentication if the first gesture information matches with the second gesture information.

2. The method according to claim 1, wherein the authenticating, by the mobile terminal, identity of the wearable device according to the security authentication information comprises:

calculating, by the mobile terminal, a distance between the mobile terminal and the wearable device according to the security authentication information, judging whether the distance between the mobile terminal and the wearable device is less than a predetermined threshold, and determining that the wearable device passes identity authentication if the distance between the mobile terminal and the wearable device is less than the predetermined threshold.

3. The method according to claim 1, wherein the authenticating, by the mobile terminal, identity of the wearable device according to the security authentication information comprises:

acquiring, by the mobile terminal, password information from the security authentication information; and comparing, by the mobile terminal, the acquired password information with pre-stored password information, and determining that the wearable device passes identity authentication if the acquired password information is consistent with the pre-stored password information.

4. The method according to claim 1, wherein the authenticating, by the mobile terminal, identity of the wearable device according to the security authentication information comprises:

acquiring, by the mobile terminal, biometric information from the security authentication information; and comparing, by the mobile terminal, the acquired biometric information with pre-stored biometric information, and determining that the wearable device passes identity authentication if the acquired biometric information is consistent with the pre-stored biometric information.

5. The method according to claim 4, wherein the biometric information comprises one or more of vein feature information, odor feature information, skin feature information, vascular texture feature information, palm feature information, eye feature information and face feature information.

6. The method according to claim 1, wherein the first gesture information is collected by the wearable device and sent to the mobile terminal.

7. The method according to claim 1, wherein the first gesture information is acquired by a touch sensor of the mobile terminal by sensing a gesture of a user.

8. The method according to claim 1, wherein after the wearable device passes security authentication of the mobile terminal, the method further comprises:

receiving, by the mobile terminal, an operation request triggered by a user, and performing a corresponding operation according to the operation request.

9. The method according to claim 8, wherein the receiving an operation request triggered by a user, and performing a corresponding operation according to the operation request comprises:

receiving, by the mobile terminal, operation requests of different levels triggered by the user;

acquiring level information from the security authentication information;

performing an operation corresponding to a level, and entering a related application.

10. A mobile terminal, comprising:

a receiver, configured to acquire first gesture information, receive security authentication information sent by a wearable device, and receive second gesture information which is collected by the wearable device, wherein the security authentication information is pre-acquired and stored in a memory of the wearable device, and the security authentication information is used by the mobile terminal to perform identity authentication of the wearable device; and a processor, configured to authenticate identity of the wearable device according to the security authentication information, authenticate the first gesture information, and determine that the wearable device passes security authentication of the mobile terminal if the wearable device passes the identity authentication and the first gesture information passes authentication;

wherein the processor is further configured to judge whether the first gesture information matches with the second gesture information, and determine the first gesture information passes the authentication if the first gesture information matches with the second gesture information.

11. The mobile terminal according to claim 10, where the processor is further configured to:

calculate a distance between the mobile terminal and the wearable device according to the security authentication information, judge whether the distance between the mobile terminal and the wearable device is less than a predetermined threshold, and determine that the wearable device passes identity authentication if the distance between the mobile terminal and the wearable device is less than the predetermined threshold.

12. The mobile terminal according to claim 10, where the processor is further configured to:

acquire password information from the security authentication information, compare the acquired password information with pre-stored password information, and determine that the wearable device passes identity authentication if the acquired password information is consistent with the pre-stored password information.

13. The mobile terminal according to claim 10, where the processor is further configured to:

acquire biometric information from the security authentication information, compare the acquired biometric information with pre-stored biometric information, and determine that the wearable device passes identity authentication if the acquired biometric information is consistent with the pre-stored biometric information.

14. The mobile terminal according to claim 10, wherein the first gesture information is collected by the wearable device and sent to the mobile terminal.

15. The mobile terminal according to claim 10, wherein the first gesture information is acquired by a touch sensor of the mobile terminal by sensing a gesture of a user.

16. The mobile terminal according to claim 10, wherein
    the receiver is further configured to receive an operation request triggered by a user, and the processor is further configured to perform a corresponding operation according to the operation request.

17. The mobile terminal device according to claim 16, wherein
    the receiver is further configured to receive operation requests of different levels triggered by the user, and the processor is further configured to acquire level information from the security authentication information; and
    the processor is further configured to perform an operation corresponding to a level, and enter a related application.

18. A mobile terminal security authentication system, comprising a mobile terminal and a wearable device coupled with the mobile terminal; wherein the wearable device is configured to send security authentication information to the mobile terminal; and the mobile terminal is configured to: acquire first gesture information, receive security authentication information sent by the wearable device, wherein the security authentication information is pre-acquired and stored in a memory of the wearable device, and the security authentication information is used by the mobile terminal to perform identity authentication of the wearable device, authenticate identity of the wearable device according to the security authentication information, authenticate the first gesture information, determine that the wearable device passes security authentication of the mobile terminal if the wearable device passes the identity authentication and the first gesture information passes authentication, and receive second gesture information which is collected by the wearable device;

wherein to authenticate the first gesture information, the mobile terminal is further configured to judge whether the first gesture information matches with the second gesture information; and determine the first gesture information passes the authentication if the first gesture information matches with the second gesture information.

* * * * *